May 13, 1969
M. v. RAUCH  3,444,427
METHOD AND DEVICE FOR ALIGNING THE FIELD AXIS OF A STIGMATOR IN AN ELECTRON-OPTICAL LENS SYSTEM
Filed March 24, 1965

3,444,427
METHOD AND DEVICE FOR ALIGNING THE FIELD AXIS OF A STIGMATOR IN AN ELECTRON-OPTICAL LENS SYSTEM
Moriz v. Rauch, Berlin, Germany, assignor to Siemens Aktiengesellschaft, Munich, Germany, a corporation of Germany
Filed Mar. 24, 1965, Ser. No. 442,389
Claims priority, application Germany, Mar. 25, 1964, S 90,205
Int. Cl. H01j 29/56, 29/46
U.S. Cl. 315—31                                           2 Claims

ABSTRACT OF THE DISCLOSURE

A method and device for aligning the field axis of a stigmator in an electron microscope lens system wherein an image of an object is produced by the operation of the lens system. Abrupt changes in the intensity of the stigmator field are made and the resulting displacement jumps of the image are observed. The stigmator field is shifted to a position where the image displacement due to the change in field intensity vanishes.

---

My invention relates to electron-optical lens system as used, for example, in electron-microscopes, and in a more particular aspect, to lens system with a stigmator for correcting astigmatism.

It is known to compensate astigmatism of electron-optical lenses, as may be caused by magnetical or electrical asymmetry, by means of a corrective device—the stigmator—which acts in the manner of a cylindrical lens and comprises suitably arranged field-producing components which, when electrically energized, produce a saddle-shaped field. The stigmator components in electrostatically operating stigmators are constituted by electrodes. The corresponding components of electromagnetically operating stigmators are constituted by electromagnets with appertaining energizing coils. The saddle-shaped electrical or magnetical field of the stigmator possesses an astigmatism whose magnitude and direction are so adjusted as to compensate for the astigmatism of the lens or lenses to be corrected.

It is important for such stigmator devices that the axis of the stigmator field accurately coincide with the field axis of the lens or group of coactive lenses to be corrected.

It is an object of my invention to devise a method and means for aligning the field axis of a stigmator in an electron-optical lens system, such as a lens system of an electron-microscope, which permits aligning the field axis of the stigmator during operation of the electron-optical equipment, requires relatively simple means and no appreciable space in the electron-optical equipment proper, and affords a high-precision adjustment with a minimum of skill.

According to the invention the field axis of the stigmator in an electron-optical lens system is aligned by producing an image of a suitable object by normal operation of the electron-optical lens system such as on a picture screen accessible to visual observation, abruptly altering the intensity of the stigmator field, simultaneously observing the resulting displacement jumps of the image, and shifting the stigmator field to a position at which the image displacements due to the alteration in field intensity are substantially zero. That is, while the intensity of the stigmator field is being changed abruptly and repeatedly, the field it shifted in the direction and to the extent required to make the jump or flicker of the image vanish.

The object of which during the adjusting process an image is being produced may consist of anything suitable to be electron-optically reproduced. Thus, the image of a test specimen may be produced by means of the lenses to be corrected. However, an image of an aperture diaphragm or an image of the electron beam cathode may also be produced for the purpose of the invention.

It is known to facilitate the proper alignment of the stigmator field axis by supplying the stigmator with alternating voltage, thus wobbling the stigmator excitation. When the field axis of the stigmator is not aligned with the field axis of the lenses to be corrected, this known method results in visually observable blurring of the electron-optical image, and the excitation of the stigmator components is then changed until the image appears with best attainable sharpness. This method requires additional equipment for selectively energizing the stigmator—ordinarily energized by constant direct voltage—with an alternating voltage suitable to produce wobbling of the image. Furthermore, it is difficult to precisely align the stigmator field axis because usually evaluating the sharpness of an electron-optical image is so largely a subjective matter as to inevitably involve appreciable inaccuracies.

In contrast thereto, the discrete and abrupt changes in stigmator excitation and the corresponding displacement jumps of the image occurring with the method of the invention, are clearly recognizable even with visual observation so that a precise adjustment of the stigmator field axis is readily obtainable, aside from the advantage that a special alternating voltage need not be supplied.

According to another feature of my invention, relating to an electrical stigmator, i.e. a stigmator equipped with magnet coils or electrical deflector electrodes, the energizing voltage applied to the stigmator components, such as the coils or electrodes, is abruptly changed. For obtaining particularly clear image jumps when the stigmator field axis is not properly aligned, it is preferable to alter the energizing voltage by its full value, namely by repeatedly switching the voltage on and off. Another way of achieving particularly good clarity of the displacement jumps is to abruptly reverse the polarity of the energizing direct voltage.

As mentioned, while the intensity of the stigmator field is being abruptly altered in the above-described manner, the field is to be shifted until the abrupt changes in stigmator voltage no longer cause displacement jumps of the image, the latter condition being indicative of the fact that the desired alignment of the stigmator field axis has been attained. For thus displacing the correction field of the stigmator, it is preferable to vary the ratio of the respective voltages which energize the individual components of the stigmator, such as the above-mentioned coils or electrode pairs. However, the shift in stigmator field may also be effected by varying the position of stigmator components.

In a stigmator whose corrective field can be controlled as to magnitude and direction, the method of the invention may also be used to advantage for determining the azimuth between the astigmatism of the electron-optical lens system and the astigamatism of the stigmator.

A particularly simple device for performing the method of the invention with an electrical stigmator comprises a key or push-button switch connected in series in the energizing circuit which supplies voltage to the stigmator, the switch being mounted outside of the vacuum space of the electron-optical apparatus so as to be actuable during operation of the apparatus. Any additional means for arresting the switch position when the stigmator is switched on are unnecessary if the contact of the key or push button is normally closed and is opened only when depressing the key or button. The abrupt changes of the stigmator field are then simply produced by depressing and/or releasing the key or button.

As mentioned, it is preferable to change the energizing voltage of the stigmator by its full value by selectively switching the switch voltage on and off. However, it suffices to reduce the voltage down to a given finite value. This may be done by means of a device in which the push button possesses a selector contact which, when actuated, alternately supplies the stigmator with two respective voltages of different magnitudes. These two voltages may be tapped off a resistance potentiometer so that only one voltage source is needed.

The invention will be further described with reference to embodiments of stigmator devices according to the invention illustrated by way of example on the accompanying drawing, in which.

Figure 1:
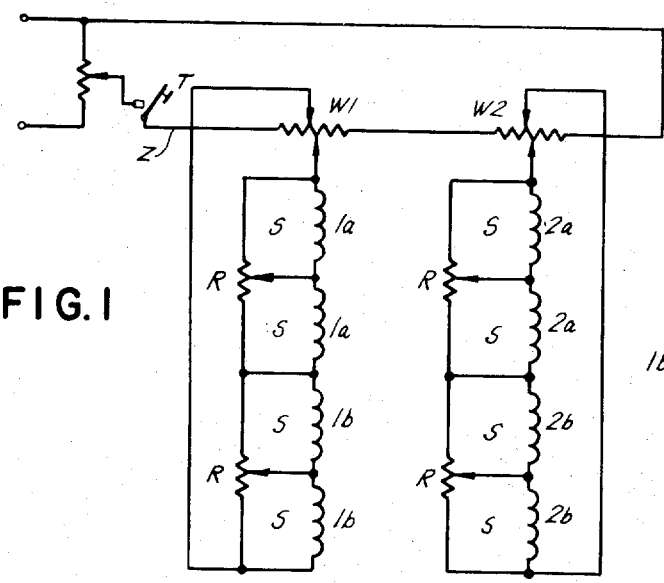
FIG. 1 is a schematic circuit diagram of an electromagnetic stigmator device.
Figure 2:
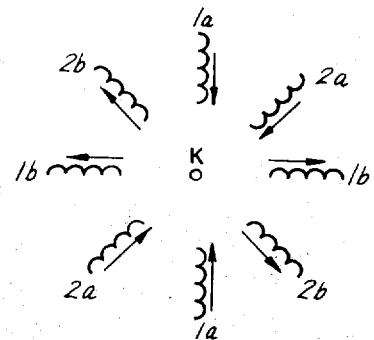
FIG. 2 shows schematically the spacial arrangement of the stigmator coils according to FIG. 1.

The stigmator shown in FIGS. 1 and 2 comprises two sets of coils S. Preferably the respective coils have the same number of turns. Each set has four coils electrically connected in series, with each two, such as the coils 1a, located opposite each other to produce mutually opposed magnetic forces as indicated by respective arrows in FIG. 2. The eight coils are uniformly distributed about the axis of the particle beam K of the apparatus, such as the electron-microscope shown in FIG. 3. Each two mutually opposed coils are connected to a voltage divider R which permits varying the ratio of the two energizing voltages impressed upon these coils. Due to the fact that the eight stigmator coils of the illustrated embodiment are subdivided into two mutually interposed sets of four, the direction of the resultant corrective stigmator field can be changed by respectively different energization of the two coil sets. Two potentiometric resistors W1 and W2 serve to supply selectively reversible direct voltages to the two sets.

It will be recognized that, regardless of the particular values of the energizing voltages taken from the resistors W1 and W2, the ratio of the energizing voltages for each two mutually opposite voltages tapped off the voltage dividers R remains preserved, so that the field axis of the correction field retains its position.

Voltages are supplied to the resistors W1 and W2 through a current-supply lead Z under control by a key switch T which permits interrupting the lead Z for producing displacement jumps of the image by abruptly shifting the beam K transverse to the axis of the apparatus. The smallness of the image jumps is a measure for the quality of the alignment of the stigmator field axis obtained by adjusting the respective taps of the voltage dividers R.

Figure 3:
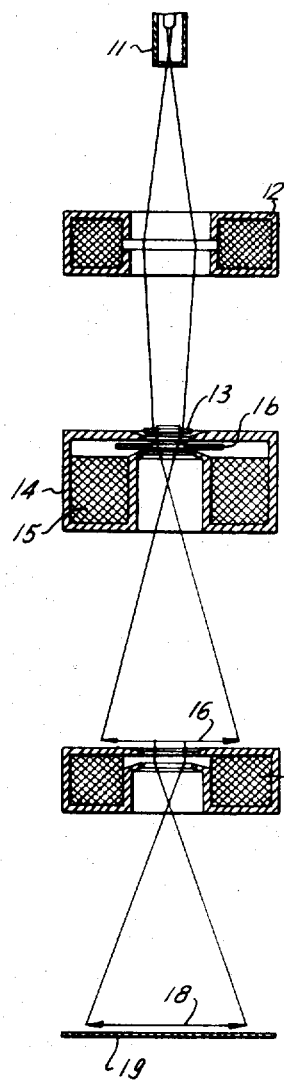
FIG. 3 is a ray-path diagram of an electron-microscope comprising an objective lens with a stigmator as shown in FIGS. 1, 2 and 4.
Figure 4:
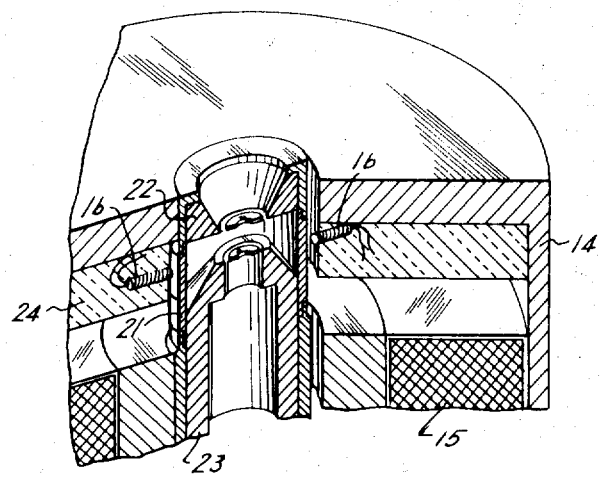
FIG. 4 is a partly sectional and perspective view of the objective lens and stigmator.

FIG. 3 shows an electromagnetic stigmator according to FIGS. 1 and 2 combined with the objective lens of a conventional electron-microscope. A beam of electrons, issuing from an electron gun 11, passes through a magnetic condenser lens 12 upon a specimen mounted on a carrier diaphragm 13. The specimen in this case serves as a test object for producing the image to be used for aligning the stigmator axis with the electron-optical axis of the objective lens shown at 14. The objective lens is of the magnetic type. Its energizing coil is denoted by 15. Mounted on the structure of the lens, as more fully shown in FIG. 4, are the above-mentioned eight stigmator coils of which only two coils 1b are visible in FIG. 3. The electron beam produces an intermediate image at 16 of which a portion is further enlarged by means of a magnetic projector lens 17 to produce an image 18 on a picture screen 19. The image 18 is visually observable in the conventional manner.

According to FIG. 4, the objective lens 14 is equipped with a non-magnetic intermediate sleeve 21 which joins its two centrally apertured pole pieces 22 and 23 together. The stigmator coils, such as those denoted by 1b, are located in the vicinity of the non-magnetic sleeve 21 and are embedded in a mounting structure 24 of synthetic plastic, for example transparent, material firmly joined with the magnetizable components of the lens structure.

Figure 5:
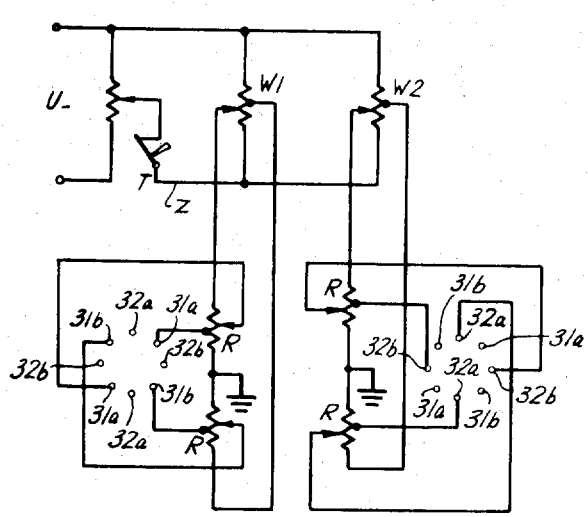
FIG. 5 is a circuit diagram of an electrostatic stigmator.

As mentioned, the invention is also applicable to stigmators of the electrical type. A circuit of such a stigmator is illustrated in FIG. 5. It will be seen that it is in all essential parts analogous to the circuit of FIG. 1 except that the coils are substituted by individual electrodes denoted by 31a, 31b, 32a and 32b. For lucid illustration, the eight electrodes are represented twice, but in the left portion of FIG. 5 only the circuit connections for the electrodes 31a and 31b are shown, whereas in the right portion of FIG. 5 only the circuit connections of the electrodes 32a and 32b are shown. The individual electrodes of the two groups follow each other alternately in the circular arrangement apparent from FIGS. 6 and 7.

Figure 7:
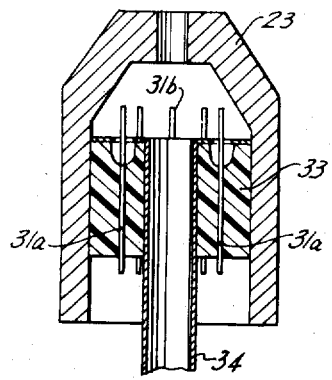
FIG. 7 shows part of FIG. 6 in section.
Figure 6:
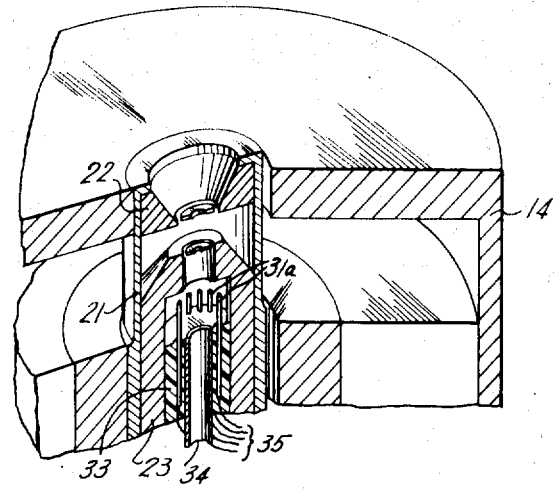
FIG. 6 is a perspective and sectional view of a lens similar to that of FIG. 4 but equipped with an electrostatic stigmator according to FIG. 5.

As shown in FIG. 6, the electrodes consist of pins which are embedded in a cylindrical holder 33 of synthetic plastic whose inner bore is preferably lined with a thin shielding tube 34 of conducting material, these details being better apparent from the section illustrated in FIG. 7.

It is preferable, as illustrated, to have the coils of an electromagnetic stigmator mounted outside of the pole shoes (FIG. 4), but to have the electrodes of an electric stigmator located within the lower pole shoe (FIGS. 6, 7).

By virtue of the invention, the stigmator-field aligning operation is readily performable during operation or ready condition of the electron-optical apparatus and with satisfactory accuracy, since it is easy to reliably decide by visual observation whether displacement jumps of the image occur when predetermined abrupt increments of change are applied to the intensity of the correction field.

I claim:

1. In an electron-optical lens system with a stigmator comprising electrically excited field-members being arranged in two groups of pairs, the two members of each pair having like polarities and being located opposite each other in spaced relation to the lens axis and in angularly spaced relation to the other pairs, the members of one group being disposed in alternating relation with the members of the other group, the combination of adjusting means for shifting the stigmator-field axis to coincide with the lens axis, and field intensity control means comprising a voltage supply circuit connected to said stigmator members and having switch means in said circuit and being actuable from the outside of said lens system for abruptly changing the stigmator voltage, whereby the field intensity variations caused by said changes of the stigmator voltage cause an image produced by the lens system to exhibit displacement jumps unless the two axes are set to coincide by said adjusting means, said adjusting means comprising two ancillary circuits connected to said voltage supply circuit, each of said ancillary circuits incorporating one of said groups of pairs respectively, each of said pairs being connected to respective voltage dividers, each of said dividers having an adjustable tap, said tap being connected to said pair so that an adjustment of the former causes a change in the energizing ratio of the latter.

2. In an electron-optical lens system according to claim 1, said intensity control means comprising two potentiometer rheostats connected in said voltage supply circuit and having respective tap means, said two ancillary circuits being connected to, and energized from, said tap means of said rheostats respectively, whereby varying said rheostat tap means causes a change in the direction of said stigmator-field axis without affecting its position.

References Cited

UNITED STATES PATENTS

| | | | |
|---|---|---|---|
| 3,071,707 | 1/1963 | Schleich | 315—14 |
| 2,976,457 | 3/1961 | Reisner | 315—31 |
| 2,973,433 | 2/1961 | Kramer | 315—31 |
| 2,580,675 | 1/1952 | Grivet et al. | 315—31 |
| 2,547,994 | 4/1951 | Bertein | 315—14 |

OTHER REFERENCES

P. Grivet, Electron Optics, 1965 (date of English translation), pp. 435 and 436.

RODNEY D. BENNETT, JR., *Primary Examiner.*

JOSEPH G. BAXTER, *Assistant Examiner.*

U.S. Cl. X.R.

315—14